United States Patent Office 3,474,074
Patented Oct. 21, 1969

3,474,074
POLYMERISATION PROCESS
Herbert May, Oldbury, near Birmingham, Brian John Kendall-Smith, Northfield, Birmingham, and Susannah Burr, Camargue, Welland, England, assignors to British Industrial Plastics Limited, London, England, a corporation of the United Kingdom
No Drawing. Filed July 26, 1965, Ser. No. 474,972
Claims priority, application Great Britain, Aug. 6, 1964, 32,092/64; Sept. 7, 1964, 36,514/64; Nov. 23, 1964, 47,555/64
The portion of the term of the patent subsequent to Apr. 23, 1985, has been disclaimed
Int. Cl. C08g 1/20
U.S. Cl. 260—73       12 Claims

ABSTRACT OF THE DISCLOSURE

A process for producing high polymers from trioxan, tetroxan, 1,3-dioxolan, 1,3-dioxepan or 1,3,5-trioxepan comprises polymerising them, with or without a co-monomer, under substantially anhydrous conditions, at a temperature between −100° C. and 150° C., and in the presence of an oxonium hexafluoroantimonate, hydroxonium hexafluoroantimonate or an aryldiazonium hexafluoroantimonate.

---

This invention relates to polymers and is especially concerned with a process for the polymerisation of cyclic acetals, i.e. compounds having a ring system wherein there is contained at least one

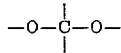

grouping.

According to the present invention a process for polymerising a cyclic acetal comprises effecting the polymerisation in the presence of a catalytic amount of an oxonium, hydroxonium or aryldiazonium hexafluoroantimonate.

The term "polymerising" as used herein is intended to include homopolymerisation of the cyclic acetals, copolymerisation of the cyclic acetals with one or more other cyclic acetals, and copolymerisation of the cyclic acetals with one or more other copolymerisable compounds.

Typical cyclic acetals which may be polymerised according to the invention include trioxan, tetroxan, 1,3-dioxolan, 1,3,5-trioxepan and 1,3-dioxepan. They may be copolymerised with each other and with such other polymerisable compounds as styrene and styrene derivatives, aldehydes, allyl compounds, cyclic esters, unsaturated aliphatic hydrocarbons, vinyl ethers and esters, and N-vinyl and C-vinyl heterocyclic compounds. Suitable such copolymerisable compounds include styrene, α-methyl styrene, α-phenyl styrene, o-, m- and p-methyl styrenes, anethole, 1-vinyl naphthalene, 2-vinyl naphthalene, stilbene, indene, coumarone, acenaphthylene; chloral, benzaldehyde, anisaldehyde, cinnamaldehyde, piperonal, butyraldehyde; allyl acetate, allyl ethyl ether, allyl bromide, allyl methacrylate, allyl Cellosolve, allyl cyanide, allyl benzene, allyl glycidyl ether, allyl alcohol, allyl beta-cyclohexyl propionate, allyl phenyl ether, diallyl phenyl phosphate; beta-propiolactone, delta-valerolactone, epsilon-caprolactone, trichloroethylidene lactate, methylene glycollate, lactide, ethylene oxalate, dioxanone; isobutene, butadiene, isoprene, pentadiene-1,3, cyclohexene, heptene-1, octene-1, cyclopentadiene, 4-vinyl cyclohexane, beta-pinene; methyl vinyl ether, ethyl vinyl ether, n-butyl ether, isobutyl vinyl ether, vinyl 2-ethyl hexyl ether, phenyl vinyl ether; vinyl acetate; N-vinyl carbazole, 2-vinyl pyridine and 2-vinyl-1,3-dioxan. Normally these other comonomers will make up between 0.01 and 50% of the units of the polymer, preferably between 0.1 and 20%.

Suitable catalysts for the process of the invention include trimethyloxonium hexafluoroantimonate, triethyloxonium hexafluoroantimonate, tripropyloxonium hexafluoroantimonate, ethyl-tetramethylene-oxonium hexafluoroantimonate, methyl- and ethyl-pentamethylene-oxonium hexafluoroantimonate, hydroxonium hexafluoroantimonate, phenyldiazonium hexafluoroantimonate, and ring-substituted phenyldiazonium hexafluoroantimonates.

The process is preferably carried out with the minimum of moisture and suitably under anhydrous conditions. It may be conducted under bulk, i.e. mass conditions or it may be of advantage to conduct the polymerisation in an inert liquid medium which may be a solvent or non-solvent for the monomers under the polymerisation conditions. Suitable solvents include saturated aliphatic and cycloaliphatic hydrocarbons, chlorinated aliphatic and cycloaliphatic hydrocarbons, and aliphatic and aromatic nitro hydrocarbons. Cyclohexane is particularly suitable. It is often convenient to add the catalyst in the form of a solution, for example in an aliphatic nitrohydrocarbon such as nitroethane or nitropropane.

The purity of the reactants is particularly emphasized and adequate purification procedures must be adopted to ensure the substantial absence of impurities. Normally efficient distillation procedures, for example, may be adequate but such procedures may be supplemented by distillation over compounds which neutralise or react with known impurities to give inert, non-volatile or easily removed reaction products.

The temperature of the reaction may vary widely, depending on the reactants, solvent and so on but will usually be between −100° C. and +150° C., preferably between −20° C. and +100° C. The reaction may, if desired, be effected under a dry inert atmosphere, such as nitrogen. In some cases it is suitable to use superatmospheric pressure.

The catalysts of the present invention can readily be removed from the formed polymer by suitable procedures, such as washing, milling or agitating the polymer with solvents for the catalysts, neutralising agents or complexing agents for the catalysts. It is particularly effective to remove the catalyst by treatment with a basic substance such as an amide or ammonia. The polymer is then thoroughly washed after such treatment to remove all residues and dried.

There may be incorporated into the polymers formed by the process of the present invention stabliisers, anti-oxidants, pigments, ultra-violet light absorbers and similar materials commonly used as additives to polymeric compositions. The polymers may also, if desired, be stablilised by treating them with compounds which react with any free end group. For instance, they may be acetylated at the end-groups by reaction with acetic acid or acetic anhydride.

It is already known to polymerise trioxan, both with and without a copolymerisable monomer, and to polymerise certain other cyclic acetals in the presence of an electrophilic catalyst, such as boron trifluoride, certain of its complexes, stannic chloride, ferric chloride, certain other inorganic fluorides and oxonium salts. We have found that the catalysts of the present invention, when applied to the polymerisation of cyclic acetals, have certain advantages over the catalysts used hitherto; for example, in the polymerisation of trioxan, the polymerisation rate is much higher and a larger percentage yield of polymer is obtained compared with known catalysts. Furthermore a trioxanstyrene copolymer produced by the method of the invention had a molecular weight more than three times the molecular weight of trioxan-styrene copolymers produced using as catalysts an oxonium fluoroborate or boron trifluoride.

The polymers produced in accordance with the invention are especially useful in extrusion, injection and compression mouldings.

The following examples are given for the purpose of illustrating the invention. In these examples the inherent viscosity has been determined on a 0.5% solution of the polymer in p-chlorophenol containing 2% α-pinene as stabiliser.

EXAMPLE 1

27 g. trioxan, freshly distilled from stearylamine and calcium hydride, and 54 g. dry cyclohexane were stirred together in a flask fitted with a condenser and kept at 60° C. in a waterbath. 0.0016 g. hydroxonium hexafluoroantimonate was added as a 1% solution in nitroethane, and polymer appeared immediately. After 1 hour the polymer was filtered off and washed thoroughly in acetone and 1½% aqueous ammonia solution, then heated to 85° C. in 3% aqueous ammonia solution for 15 minutes. It was then washed in water and acetone, and dried in a vacuum oven. The yield was 12 g. (45% of theoretical) of white polymer, of inherent viscosity 1.56.

EXAMPLE 2

28 g. trioxan, freshly distilled from stearylamine and calcium hydride, 56 g. dry cyclohexane and 0.8 g. styrene were stirred together at 60° C. 0.00085 g. hydroxonium hexafluoroantimonate was added as a 1% solution in nitroethane, and polymer appeared immediately. After 1 hour it was filtered off and treated as in Example 1. The yield was 8.4 g. (33% theoretical) of polymer of inherent viscosity 1.02.

EXAMPLE 3

27 g. trioxan, distilled from calcium hydride and stearylamine, and 54 g. dry cyclohexane were stirred together in a flask fitted with a condenser and kept at 60° C. in a waterbath. 0.0016 g. phenyldiazonium hexafluoroantimonate was added as a 1% solution in nitroethane and polymerisation commenced almost immediately. After 1 hour the resultant white polymer was filtered off and was washed in 200 mls. acetone and then in 200 mls. 1.5% aqueous ammonia before being heated to 85° C. for 15 minutes in 250 mls. 3% aqueous ammonia. It was then thoroughly washed in water and acetone and dried in a vacuum oven. The yield was 16.5 g. (61% theoretical) of white polymer having an inherent viscosity of 2.00.

EXAMPLE 4

28. g. trioxan, distilled from calcium hydride and stearylamine, 0.85 g. styrene and 56 g. dry cyclohexane were stirred together at 60° C. and 0.0017 g. phenyldiazonium hexafluoroantimonate was added as a 1% solution in nitroethane. Polymer appeared almost immediately and after 1 hour it was filtered off and treated as described in Example 3. The yield was 10.3 g. (36% theoretical) of white polymer having an inherent viscosity of 1.54.

EXAMPLE 5

A reaction vessel was charged with 23.7 g. trioxan (freshly distilled from stearylamine and calcium hydride) and 47.4 g. cyclohexane (which had been dried by passing through an Amberlite IR-120 ion-exchange column). The solution was maintained at 60° C. in an atmosphere of dry air and 0.12 g. of a 1% solution of triethyloxonium hexafluoroantimonate in 1-nitropropane was added with vigorous agitation. The trioxan polymerised rapidly; the reaction was allowed to proceed for 3 hours.

When polymerisation was complete, about 50 ml. acetone were added and the resulting slurry was filtered. The resulting white polymer was homogenised by high speed agitation with about 100 ml. acetone, filtered, and washed with about 200 ml. distilled water. The polymer was then treated with 400 ml. approximately 3% aqueous ammonia at 85° C. for 5 minutes, filtered, washed with about 200 ml. distilled water, homogenised with acetone as before and finally dried in a vacuum oven at 50° C. The polymer had an inherent viscosity of 1.60.

EXAMPLE 6

A reaction similar to that described in Example 5 was carried out, with the exception that 30.5 g. trioxan and 61 g. cyclohexane were employed, 0.9 ml. styrene was incorporated as comonomer, and the reaction was catalysed by 0.15 g. of a 1% solution of triethyloxonium hexafluoroantimonate in 1-nitropropane. The resulting polymer had an inherent viscosity of 1.84.

EXAMPLE 7

A reaction vessel was charged with 50 g. trioxan (freshly distilled over stearylamine and calcium hydride), 100 g. cyclohexane and 1.5 ml. vinyl acetate. The mixture was maintained at 60° C. and stirred vigorously. 0.005 g. triethyloxonium hexafluoroantimonate (as a 25% solution in nitroethane) was injected into the mixture, whereupon polymerisation rapidly ensued. After 12 minutes the reaction was terminated by the addition of a small amount of acetone and the product was slurried and homogenised by high speed agitation with a larger amount of acetone and filtered. The filter cake was slurried and stirred with 1% aqueous ammonia at 85° C. for 15 minutes, homogenised with water and acetone and dried in a vacuum oven at 50° C. The conversion to polymer was 59% theoretical.

EXAMPLE 8

An experiment similar to that described in Example 7 was carried out except that 1.5 mls. allyl acetate was used as comonomer instead of vinyl acetate, and the amount of triethyloxonium hexafluoroantimonate catalyst was 0.0125 g. Polymer was formed in 66% yield, and had an inherent viscosity of 2.36.

What is claimed is:

1. A process for polymerising a cyclic acetal selected from the class consisting of trioxan, tetroxan, 1,3-dioxolan, 1,3-dioxepan and 1,3,5-trioxepan, said process comprising effecting the polymerisation under substantially anhydrous conditions in the presence of a catalyst selected from the class consisting of oxonium hexafluoroantimonates, hydroxonium hexafluoroantimonates and aryldiazonium hexafluoroantimonates, the polymerisation being effected at a temperature between −100° C. and 150° C.

2. A process for polymerising a cyclic acetal according to claim 1 which comprises effecting the polymerisation in the presence of a catalyst selected from the class consisting of trimethyloxonium hexafluoroantimonate, triethyloxonium hexafluoroantimonate, tripropyloxonium hexafluoroantimonate, ethyl - tetramethylene - oxonium hexafluoroantimonate, methyl - pentamethylene - oxonium hexafluoroantimonate, ethyl - pentamethylene- - oxonium hexafluoroantimonate and hydroxonium hexafluoroantimonate.

3. A process for polymerising a cyclic acetal according to claim 1 which comprises effecting the polymerisation in the presence of a catalyst selected from the class consisting of phenyldiazonium hexafluoroantimonate, and ring-substituted phenyldiazonium hexafluoroantimonates.

4. A process for polymerising a cyclic acetal according to claim 1 which comprises effecting the polymerisation under mass polymerisation conditions.

5. A process for polymerising a cyclic acetal according to claim 1 which comprises effecting the polymerisation in the presence of an inert liquid medium.

6. A process according to claim 5 wherein the cyclic acetal is in solution in an inert liquid medium and the catalyst is added in solution in a different inert liquid medium.

7. A process according to claim 6 wherein the cyclic acetal is dissolved in cyclohexane and the catalyst is added in solution in nitroethane.

8. A process for preparing a copolymer under substantially anhydrous conditions which consists essentially in stirring together trioxan and styrene in cyclohexane at 60° C., adding thereto a catalytic amount of hydroxonium hexafluoroantimonate in nitroethane, and recovering the resulting polymer.

9. A process for preparing a copolymer under substantially anhydrous conditions which consists essentially in stirring together trioxan and styrene in cyclohexane at 60° C., adding thereto a catalytic amount of phenyldiazonium hexafluoroantimonate in nitroethane, and recovering the resulting polymer.

10. A process for preparing a copolymer under substantially anhydrous conditions which consists essentially in maintaining a mixture of trioxan and styrene in cyclohexane at 60° C., adding thereto a catalytic amount of triethyloxonium hexafluoroantimonate in 1-nitropropane, and recovering the resulting polymer.

11. A process for preparing a copolymer under substantially anhydrous conditions which consists essentially in stirring together trioxan and vinyl acetate in cyclohexane at 60° C., adding thereto a catalytic amount of triethyloxonium hexafluoroantimonate in nitroethane, and recovering the resulting polymer.

12. A process for preparing a copolymer under substantially anhydrous conditions which consists essentially in stirring together trioxan and allyl acetate in cyclohexane at 60° C., adding thereto a catalytic amount of triethyloxonium hexafluoroantimonate in nitroethane, and recovering the resulting polymer.

References Cited

UNITED STATES PATENTS

| | | | |
|---|---|---|---|
| 3,197,438 | 7/1965 | Wood. | |
| 3,219,631 | 11/1965 | Kullmar et al. | |
| 3,317,477 | 5/1967 | Wilson et al. | 260—73 |
| 3,316,217 | 4/1967 | Weissermel et al. | |
| 3,379,655 | 4/1968 | May et al. | 260—2 |

JOSEPH L. SCHOFER, Primary Examiner

J. C. HAIGHT, Assistant Examiner

U.S. Cl. X.R.

260—2, 67